M. SALTIS.
PORTABLE STRETCHER.
APPLICATION FILED APR. 14, 1914.
1,109,083.
Patented Sept. 1, 1914.
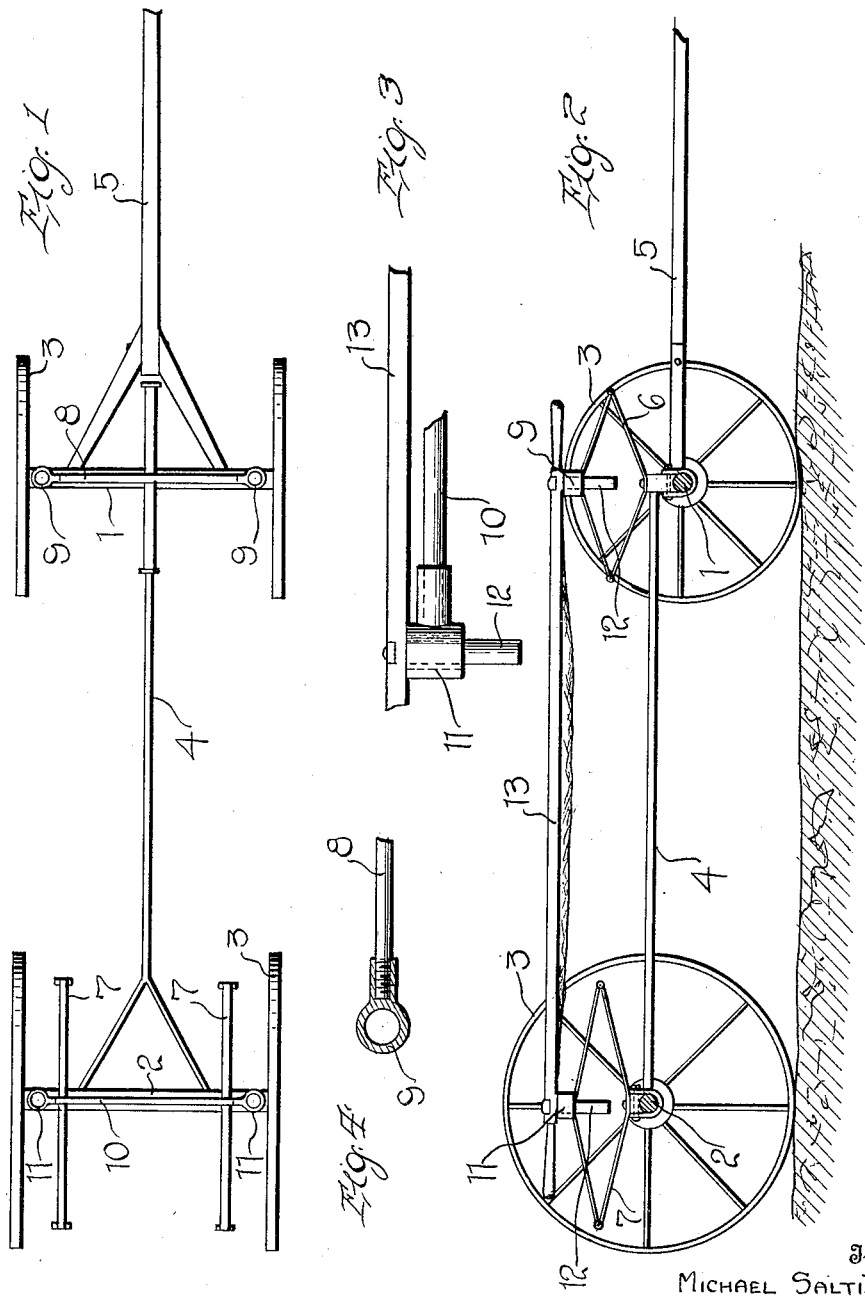
Inventor
MICHAEL SALTIS

UNITED STATES PATENT OFFICE.

MICHAEL SALTIS, OF FORT WILLIAM McKINLEY, PHILIPPINE ISLANDS.

PORTABLE STRETCHER.

1,109,083.  Specification of Letters Patent.  Patented Sept. 1, 1914.

Application filed April 14, 1914. Serial No. 831,865.

*To all whom it may concern:*

Be it known that I, MICHAEL SALTIS, a citizen of the United States, residing at Fort William McKinley, Philippine Islands, have invented certain new and useful Improvements in Portable Stretchers, of which the following is a specification, reference being had to the accompanying drawings.

This invention relates to new and useful improvements in stretchers and more particularly to a portable stretcher, the main object of the invention being to provide a portable stretcher which is especially adapted for use upon battle fields and includes a truck provided with means whereby the ordinary construction of stretcher may be readily mounted upon the truck and quickly removed therefrom.

Another object of the present invention is the provision of a stretcher of the above character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a top plan view of a portable stretcher constructed in accordance with my invention, the supporting stretcher being removed therefrom. Fig. 2 is a side elevation. Fig. 3 is a detail side elevation, illustrating the manner of mounting the stretcher; and Fig. 4 is a detail sectional view illustrating the manner of removably securing the sockets to the supporting rods.

In carrying out my invention I provide a truck which includes the front axle 1, the rear axle 2, and the wheels 3 which are mounted upon the ends of both the front and rear axles. The axles are connected by means of an ordinary reach pole 4, and connected to the intermediate portion of the front axle 1 is the tongue 5 whereby the draft animals may be readily attached to the truck. Mounted upon the central portion of the forward axle 1 and rigidly secured thereto is an elliptical spring 6 and mounted upon the rear axle 2 upon opposite sides of the center are the spaced elliptical springs 7 which are rigidly secured to the axle 2. Mounted upon the upper side of the springs 6 and secured thereto at its central portion is a transverse supporting bar 8 having socket members 9 secured to the end thereof and which are preferably removably mounted upon the ends of the rod 8 so that they may be detached if desired. Arranged between the springs 7 and having its ends secured to the upper faces of each of said springs is the rear transverse bar 10, mounted upon ends of which are the removable sockets 11, said sockets being preferably of the same construction as the sockets 9 upon the bar 8 and the sockets 9 and 11 are adapted to receive the supporting legs 12 of the stretcher 13.

It will be understood that in the use of my improved device any well known form of stretcher may be used other than the form herein described and illustrated.

It will be apparent from the accompanying drawings that in the use of my improved stretcher the truck may be readily transported from place to place and the stretcher 13 readily mounted thereon by having the supporting legs 12 engaged within the sockets 9 and 11. It will be apparent that by having the stretcher mounted in this manner, it may be quickly and readily removed from the truck and conveyed to any desired place. This stretcher as herein shown and described is preferably for use upon battle fields and removing the wounded. It will be apparent that by arranging the springs 6 and 7 beneath the stretcher, they will absorb the shock or jar which would be otherwise conveyed to the stretcher mounted upon the truck.

My device as herein shown and described is extremely simple in construction and can be manufactured and placed upon the market at a comparatively small cost.

It will be readily apparent that my improved truck can be used for conveying any form of stretcher desired, it being understood that the transverse rods or bars 8 and 10 will be of sufficient length to accommodate the ordinary sized stretcher.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the class described including a supporting truck having removable socket members yieldably mounted thereon, and a stretcher having its supporting legs removably arranged within said sockets, as and for the purpose set forth.

2. A device of the class described including a truck having a forward and rear axle, an elliptical spring secured centrally to the forward axle, a set of elliptical springs arranged upon opposite sides of the center of the rear axle and rigidly secured thereto, a transverse bar mounted upon the upper side of the first spring and a second transverse bar mounted upon the upper side of the second springs, removable socket members carried by the ends of said bars and a stretcher having its supporting legs removably arranged within said sockets as and for the purpose set forth.

In testimony whereof I hereunto affix my signature in the presence of two witnesses.

MICHAEL SALTIS.

Witnesses:
 ARTHUR C. MINNING,
 RICARDO PARÁS.